Nov. 24, 1964 J. V. O'NEILL ETAL 3,158,213

DRILL STRING SUSPENSION ARRANGEMENT

Filed Aug. 26, 1960 9 Sheets-Sheet 1

INVENTORS
JOSEPH V. O'NEILL
GEORGE HOMANICK
BY
WILSON, SETTLE, McRAE & CRAIG

INVENTOR.
JOSEPH V. O'NEILL
GEORGE HOMANICK
BY
WILSON, SETTLE, McRAE & CRAIG

DRILL STRING SUSPENSION ARRANGEMENT

Filed Aug. 26, 1960 9 Sheets-Sheet 3

INVENTOR.
JOSEPH V. O'NEILL
GEORGE HOMANICK
BY
WILSON, SETTLE, McRAE & CRAIG

DRILL STRING SUSPENSION ARRANGEMENT

Filed Aug. 26, 1960 9 Sheets-Sheet 4

INVENTOR.
JOSEPH V. O'NEILL
BY GEORGE HOMANICK

WILSON, SETTLE, McRAE & CRAIG

INVENTOR.
JOSEPH V. O'NEILL
BY GEORGE HOMANICK
WILSON, SETTLE, McRAE & CRAIG

DRILL STRING SUSPENSION ARRANGEMENT

Filed Aug. 26, 1960 9 Sheets-Sheet 6

*INVENTOR.*
JOSEPH V. O'NEILL
BY GEORGE HOMANICK
WILSON, SETTLE, McRAE & CRAIG

DRILL STRING SUSPENSION ARRANGEMENT

Filed Aug. 26, 1960 9 Sheets-Sheet 7

*INVENTOR.*
IOSEPH V. O'NEILL
*BY* GEORGE HOMANICK
WILSON, SETTLE, McRAE & CRAIG

Nov. 24, 1964 J. V. O'NEILL ETAL 3,158,213

DRILL STRING SUSPENSION ARRANGEMENT

Filed Aug. 26, 1960 9 Sheets--Sheet 8

INVENTOR.
JOSEPH V. O'NEILL
BY GEORGE HOMANICK

WILSON, SETTLE, McRAE & CRAIG

INVENTOR.
JOSEPH V. O'NEILL
BY GEORGE HOMANICK
WILSON, SETTLE, McRAE & CRAIG 3,158,213
DRILL STRING SUSPENSION ARRANGEMENT
Joseph V. O'Neill, Inkster, and George Homanick, Livonia, Mich., assignors, by direct and mesne assignments, to Leyman Corporation, Cincinnati, Ohio
Filed Aug. 26, 1960, Ser. No. 52,274
4 Claims. (Cl. 175—85)

This invention relates to well drilling apparatus, and particularly to apparatus which permits the drilling to be carried out automatically with a minimum of human intervention and effort.

The invention in one of its embodiments comprehends a derrick structure having a vertically slidable drill head for suspending and rotating a pipe string in a well hole, together with a mechanism below the drill head for cooperating therewith in assembling and disassembling pipe into and out of the string in an automatic manner. Preferably all of the components of the apparatus are operated in an automatic or semiautomatic manner, as by a system of fluid motors and hydraulic cylinders.

One object of the invention is to provide a well drilling apparatus which can be operated with minimum direct human effort or intervention.

Another object of the invention is to provide an apparatus having a novel fluid pressure system for efficiently utilizing power from a prime mover such as a diesel engine. the arrangement being such that the drilling operations can be carried out with a relatively low cost power plant.

An additional object of the invention is to provide well drilling apparatus which can be operated automatically to add pipe to and remove pipe from the drill string without manual handling of the individual pipe or drill string.

A further object is to provide a well drilling apparatus which utilizes a novel pump-pressure accumulator arrangement.

A still further object is to provide a well drilling apparatus having a novel means for storing energy from the power plant and applying same to the drilling components as necessary, whereby to make possible the employment of a relatively small low cost power arrangement.

An additional object of the invention is to provide a well drilling apparatus which can be controlled with simple control devices.

An additional object of the invention is to provide a drilling apparatus having a novel sequence of operational movements.

A further object of the invention is to provide a drilling apparatus which assumes an improved control over the pipe during the drilling periods, string connecting periods, and string disconnecting periods.

A still further object is to provide a rig which is of such design as to handle different size pipe and casing with minimum adjustment of the rig components.

Other objects of this invention will appear in the following description and appended claims, reference being had to the accompanying drawings forming a part of this specification wherein like reference characters designate corresponding parts in the several views.

Referring to the drawings.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
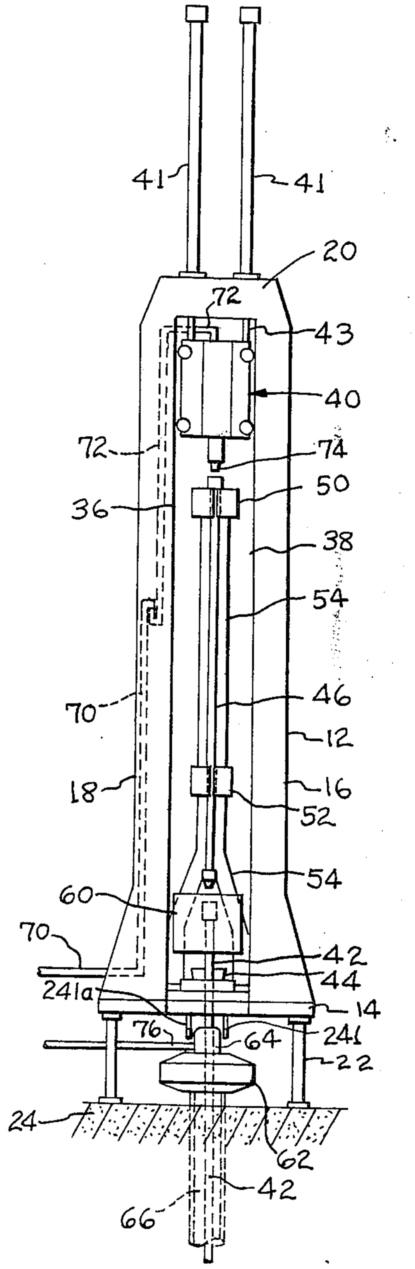
FIG. 1 is a front elevational view of one embodiment of the invention.
Figure 2:
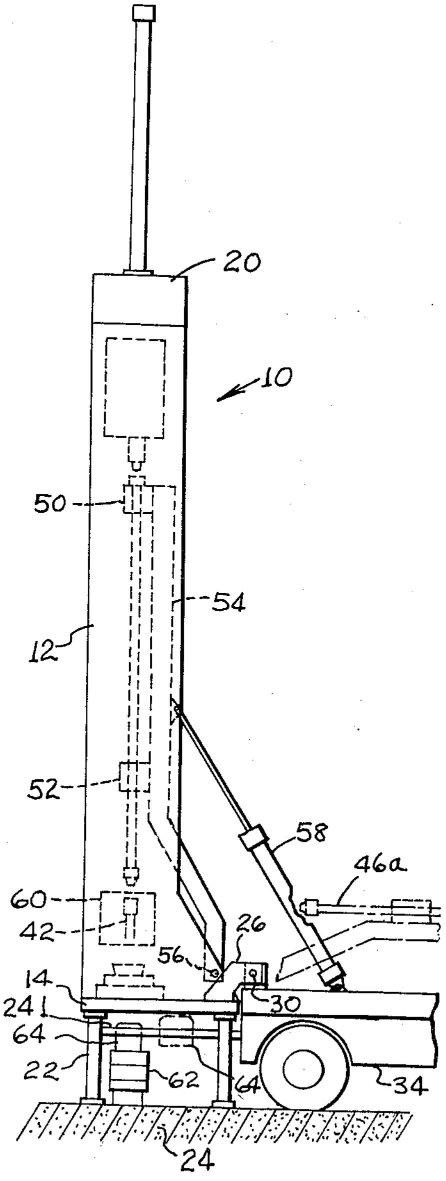
FIG. 2 is a right side elevational view of the FIG. 1 embodiment.

Referring to the drawings and particularly FIGS. 1 and 2, there is disclosed a well drilling apparatus 10 including an upstanding derrick structure 12 defined by the base 14, the two upstanding side portions 16 and 18, and the upper cross head portion 20. Suitable posts or columns 22 may be employed to support the derrick on the well site 24. It will be seen from FIG. 2 that the derrick is equipped with the arm structure 26 which is pivotally interconnected at 30 with an upstanding mount structure carried on the rear portion of a trailer 34. The arrangement is such as to permit the entire derrick structure to be pivoted about the pivot axis 30 so as to be disposed in a horizontal position above the trailer 34 for transporting same between drilling sites. The details of this transport arrangement are more completely shown in co-pending application Serial No. 42,132, filed July 11, 1960 and entitled "Portable Drill Rig."

Referring to FIG. 1, the derrick cross head portion 20 mounts two fluid cylinders 41, and the derrick side portions 16 and 18 mount the vertical guide rails 36 and 38, said rails serving to slidably guide the drill string suspension means 40 for vertical movement within the derrick structure. It will be understood that vertical motion is imparted to suspension means 40 by the introduction and exhaustion of pressure fluid to and from the lower ends of cylinders 41, i.e. below the pistons located therewithin. The pistons are carried on piston rods 43 which connect with suspension means 40, and it will therefore be seen that the suspension means can be raised and lowered by the appropriate direction of pressure fluid relative to cylinders 41.

In FIG. 1 the suspension means is shown in its elevated position, and the drill string 42 is shown in a position temporarily supported by the temporary suspension means 44. In the FIG. 1 position the space between temporary suspension means 44 and the suspension means 40 is occupied by a drill pipe 46, and the components of the apparatus are shown in the process of assembling the pipe 46 into the drill string. The pipe 46 is, as shown in FIG. 1, gripped by the jaw structures 50 and 52 carried on the upstanding transfer arm 54. As shown in FIG. 2 the transfer arm is fulcrumed for pivotal movement around the axis designated by numeral 56, and power for the pivotal movement is provided by the fluid cylinder means 58. It will be understood that transfer arm 54 serves as a means for delivering the pipe, such as pipe 46, between a vertical position aligned with the pipe string and a substantially horizontal position 46a located away from the drilling apparatus. In position *46a* the pipe can be conveyed by means (not shown) to a storage area. In this connection it will be realized that during a drilling operation considerable numbers of pipe are required to be shuttled between the storage areas and the drill string as the drilling operation proceeds and as it becomes necessary to disassemble the pipe string for bit replacement operations and the like. Under the present invention the details of the storage area may be varied considerably, but one suitable arrangement is shown in the above-mentioned patent application, Serial Number 42,132.

Referring again to FIG. 1, it will be seen that the upper portion of the pipe string 42 extends within a mechanism 60. Mechanism 60 serves to alternately tighten and loosen the joint between the upper pipe such as pipe 46 and the pipe string 42. The details of this mechanism are better shown in FIGS. 5 through 7, but it will be understood that the mechanism comprehends a plurality of powered sets of jaws for gripping the adjacent portions of adjoining pipe sections, together with rotary power means for applying a torque to loosen or tighten the threaded joint between sections.

In the space below the derrick base 14 there is provided a blow-out preventer mechanism 62, and a sealing mechanism 64. The details of these mechanisms are illustrated in FIG. 11 through 15. Mechanism 64 serves to seal the joint around the rotary drill string. Mechanism 62 serves generally to close off the well hole from the above-earth atmosphere in the event of excessive pressure development within the well hole. The illustrated apparatus can be utilized with conventional mud drilling procedures or with air drilling procedures. In either case, the fluid (air or mud) will be utilized to carry off the cuttings formed at the bottom of the well hole as the drilling operation proceeds. The fluid may be circulated by introduction thereof into a pipe 70 and flexible tube 72. The suspension means 40 is suitably constructed so that the fluid is then fed into the drill string 42 via the hollow threaded spindle 74. The fluid flows downwardly within string 42 out the conventional openings in the drill bit at the bottom of the well hole, and upwardly in the annular space 66 where it is then passed through the blow-out preventer 62 and out the discharge pipe 76 to the atmosphere (if air is used) or to a mud reclamation system (if mud is used).

From the above brief discussion, it will be seen that the illustrated apparatus comprehends the following components:

(1) Pipe transfer means 54.
(2) Drill string suspension means 40.

(3) Joint loosening-tightening mechanism 60.
(4) Temporary string suspension means 44.
(5) Sealing and blow-out prevention means 64 and 62.

The details of the above-enumerated components will be discussed in the order set out above.

*Pipe Transfer Means 54*

This means is best shown in FIGS. 1 and 2. As there shown, said means comprises an elongated arm having a pivotal mounting at 56 to permit it to swing between the generally horizontal dotted line position of FIG. 2 and generally upright full line position (FIGS. 1 and 2). The arm is equipped with suitable powered pipe-gripping jaws such as those shown at 50 and 52. These jaws may be varied as to detail, but one suitable construction is depicted in the aforementioned application, Serial No. 42,132.

Figure 3:
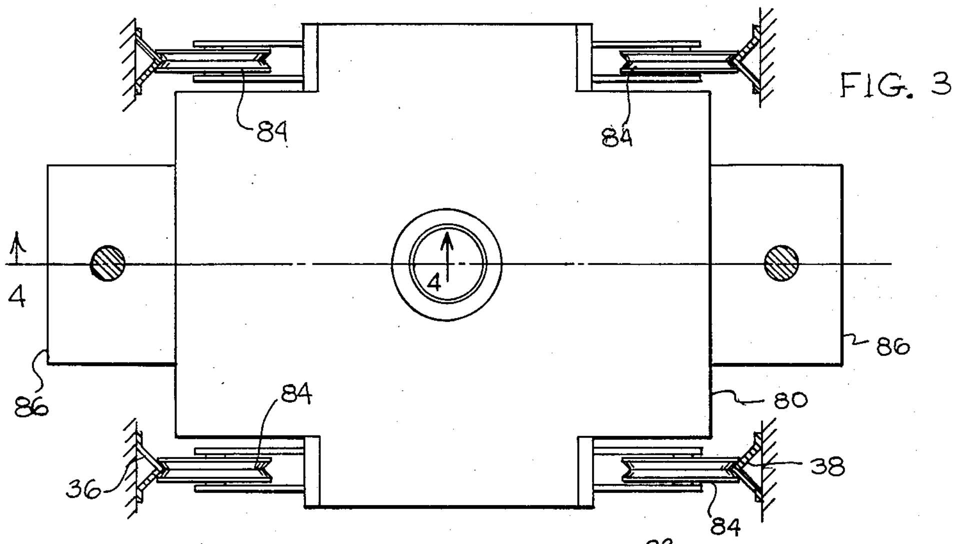
FIG. 3 is an enlarged top plan view of a drill string suspension mechanism utilized in the FIG. 1 embodiment.
Figure 4:
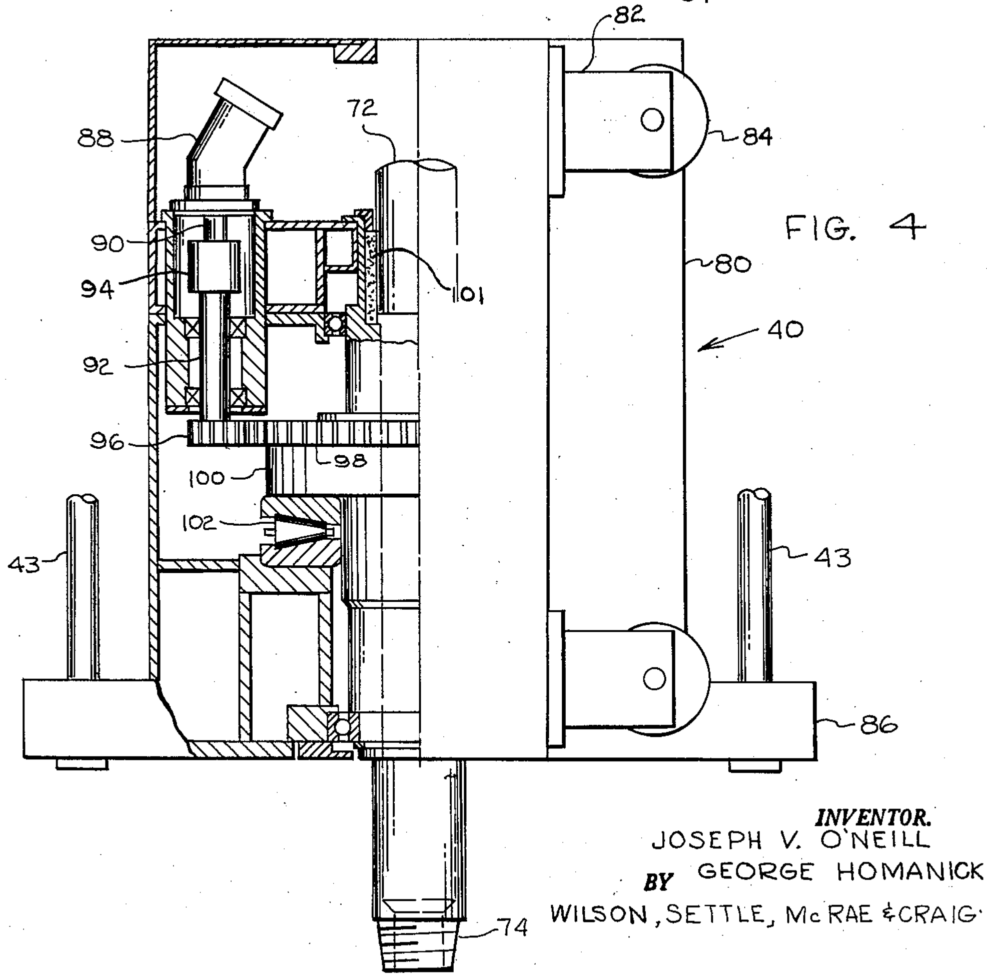
FIG. 4 is an elevational view of the FIG. 3 suspension mechanism, with parts thereof broken away on line 4—4 in FIG. 3.

*Drill String Suspension Means 40* (*FIGS. 3 and 4*)

Referring to FIG. 3, the suspension means comprises a housing 80 having brackets 82 mounted thereon for carrying the V-rollers 84, said rollers engaging the vertical tracks 36 and 38 to guide the suspension means for vertical movement within the derrick structure. As previously noted, the string suspension means is raised and lowered by means of the fluid cylinders 41. The piston rods 43 for these fluid cylinders are connected at their lower ends with the extensions 86 on the housing 80.

During the drilling operation it is necessary to rotate the drill string in the well hole, and in the illustrated embodiment the power for rotating the drill string is supplied by two fluid motors, one of which is shown at 88 in FIG. 4. The output shaft 90 of the fluid motor is drivingly connected to the shaft 92 via a flexible coupling 94 so that operation of fluid motor 88 serves to rotate shaft 92 and the pinion gear 96 carried thereon. Gear 96 meshes with the peripheral teeth on the large gear 98 carried by the rotary housing 100. Suitable bearings 102 are provided to support the rotary housing 100 and the weight of the drill string suspended from the threaded spindle 74 which is formed as part of housing 100.

As will be seen from FIG. 4, housing 100 is of hollow construction, with the hollow interior thereof communicating with a tube or hose 72. A suitable seal is provided at 101 to close the joint between the tube and rotary housing 100. As previously indicated, tube 72 serves as a conduit for supplying the drill string with cutting fluid, either air or mud as desired.

It will be understood that in operation of suspension means 40 the fluid cylinders 41 and fluid motors 88 will be operated together or separately in accordance with the particular operation being performed at any one instant. Thus, during the operation of earth drilling the pressure fluid will be slowly controllably exhausted from fluid cylinders 41 while the motors 88 are rotating to drive the bit at the lower end of the string and maintain a desired pressure on the bit; i.e. the pressure will be maintained in cylinders 41 sufficient so that only a desired portion of the string weight is applied to the bit. During the operation of drawing the string upwardly in the well hole (for string disassembly purposes) the fluid motors 88 will be deenergized, and the fluid cylinders 41 will be pressurized to drive rods 43 upwardly.

Figure 5:
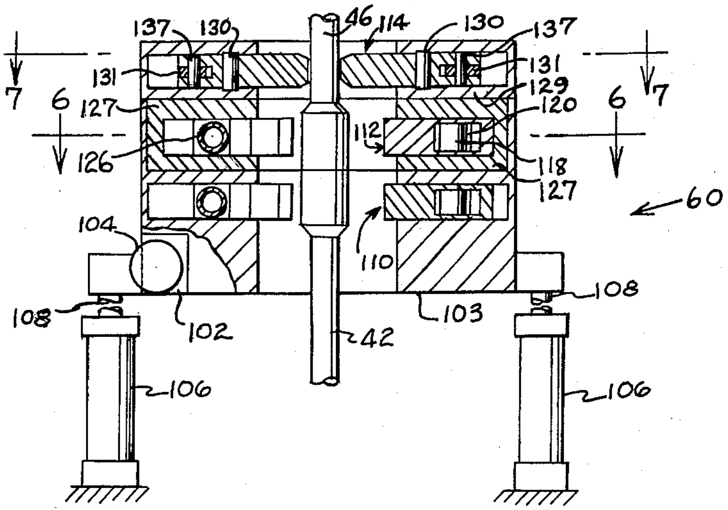
FIG. 5 is an enlarged sectional view taken along lines 5—5 of FIGURES 6 and 7 of a pipe joint tightening and loosening mechanism employed in the FIG. 1 embodiment.
Figure 6:
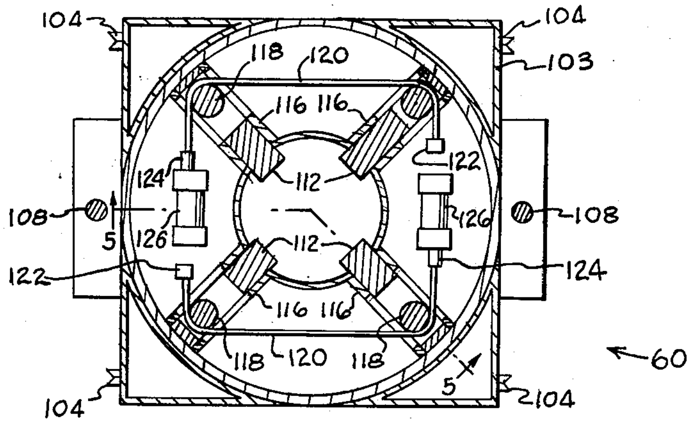
FIG. 6 is a sectional view taken substantially on line 6—6 in FIG. 5.
Figure 7:
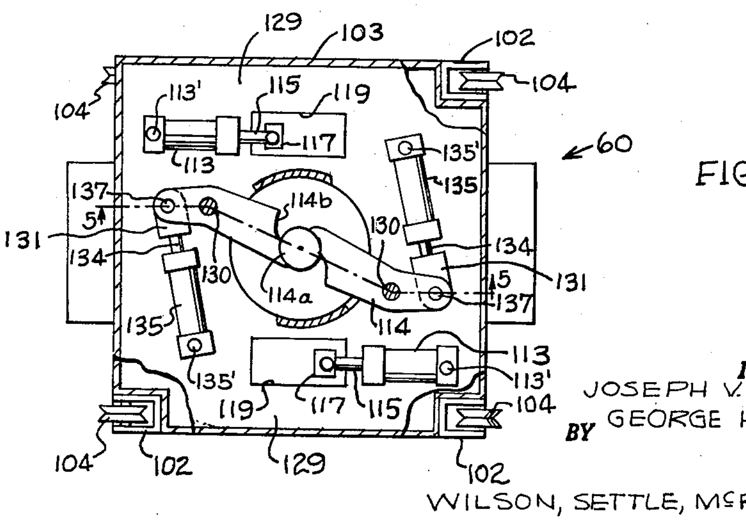
FIG. 7 is a sectional view taken substantially on line 7—7 in FIG. 5.

*Joint Loosening-Tightening Mechanism 60* (*FIGS. 5 Through 7*)

Referring to FIG. 5, the mechanism there shown comprises a housing 103 having brackets 102 carried thereon for journaling the V-rollers 104, said rollers being adapted to engage lower portions of the previously-mentioned tracks 36 and 38 to mount mechanism 60 for vertical slidable movement within the derrick structure. In order to provide power for moving mechanism 60 in the vertical direction said mechanism is provided with fluid cylinders 106 which are equipped with the piston rods 108.

Referring to FIG. 5, there are provided three sets of jaws indicated generally by the differentiating numerals 110, 112 and 114. Jaws 114 serve merely as retractable guiding devices for guiding the upper pipe into the lower pipe during pipe-connecting movements, the purpose in the retracting feature being to permit enlargement of the central space within mechanism 60 as required during certain periods as will be apparent hereinafter.

As shown in FIG. 7, each of the jaws 114 is provided with two arcuate pipe-contacting surfaces 114*a* and 114*b*. Contact surface is 114*a* is operative to guide drill pipe, and contact surface 114*b* is operative to guide casing (when piston rod 134 is advanced from cylinder 135). It will be understood that the stroke of each piston rod 134 is controlled so that surfaces 114*a* and 114*b* have a relatively loose, non-grip engagement with the pipe and casing respectively. Each of the jaws 114 is formed as a lever fulcrumed on a pin 130 carried in housing 103. One end of each lever is bifurcated to form vertically spaced finger portions for reception of a flange member 131 carried on the piston rod 134 of a fluid cylinder 135. A pivot pin 137 is provided to operatively connect each lever 114 with its piston rod. Also, the cylinders 135 are mounted on pivot pins 135' for requisite pivotal movement.

It will be seen that by the illustrated arrangement suitable introduction of pressure fluid into cylinders 135 is effective to retract the piston rods 134 so as to cause the jaws 114 to take positions for guiding an upper pipe 46 accurately into the central space between jaws 112 (FIG. 5). The guiding action is particularly desired to ensure that the threads of the male portion on the lower end of pipe 46 correctly align with and enter into the threads of the female portion on the upper end of pipe 42. Conventionally the thread-aligning operation is performed manually, and due to the heavy weight of the pipe a certain swinging or pendulum action is imparted to the upper pipe which makes the aligning and threading operation difficult to perform quickly or easily. However by the illustrated arrangement of jaws 114 above the joint-tightening jaws the operation may be performed quickly and without manual assistance or intervention.

As best shown in FIG. 6, each of the tightening jaws 112 is mounted for movement toward and away from the well hole axis by means of the guides 116. Each jaw carries a circular sprocket pin or roller at 118, and a chain cable, strap or the like 120 is trained therearound. As shown in FIG. 6 of the drawings there are provided two cables, one for each of two adjoining jaws. One end of each cable is anchored as at 122, and the other end of each cable is connected with the piston rod 124 of a fluid cylinder 126. It will be seen that by this arrangement pressure fluid can be introduced into two cylinders 126 so as to drive the piston rods 124 inwardly in a manner to exert a pull on cables 120 for thereby advancing the four jaws 112 toward the well hole axis. Conventional return means, not shown, are used to bias the pins 118 to a retracted position when the tension applied by cables 120 and cylinders 126 is released. Such conventional return means could include springs, such not being shown for purposes of avoiding complications to the drawings. This arrangement is utilized in the operation of loosening and tightening the pipe sections on one another.

The various jaws 112 and cylinders 126 are mounted on a rotary platform or sub-housing 127 carried in the space below partition 129 within housing 103 (FIG. 5). Partition 129 is provided with slots 119 (FIG. 7) through which extend the lugs or brackets 117. Each bracket extends upwardly from a portion of sub-housing 127, and each bracket has a swivel connection with the piston rod 115 of a double acting fluid cylinder 113 pivotally carried on partition 129 by pins 113'. The arrangement is such that suitable introduction of pressure fluid into each cylinder 113 causes sub-housing 127 to be rotated relative to housing 103 for loosening or tightening the joint between pipe string 42 and pipe 46.

As will be seen from FIG. 5 pipe string 42 may be gripped by radial jaws 110. In the illustrated embodiment these jaws are powered by cable-fluid cylinder means and retracting means similar to that shown in FIG. 6 for jaws 112. However jaws 110 are mounted on housing 103 rather than on a rotary sub-housing as in the case of jaws 112.

In summary, it will be understood that jaws 114 function as retractable pipe guides, and that jaws 112 and 110 perform the actual tightening or loosening operations. The torque for loosening or tightening is provided by cylinders 113.

It will be appreciated that the stroke of piston rods 115 is insufficient to completely separate or completely form the threaded connections between pipe string 42 and pipe 46. The cylinders 115 serve only to untorque or torque the joint, the subsequent spinning off or spinning on of the joint being performed by operation of the fluid motors 88 in the previously described string suspension means 40 (FIGS. 3 and 4).

*Temporary Suspension Means 44 (FIGS. 8 Through 10)*

Figures 8, 9, 10:
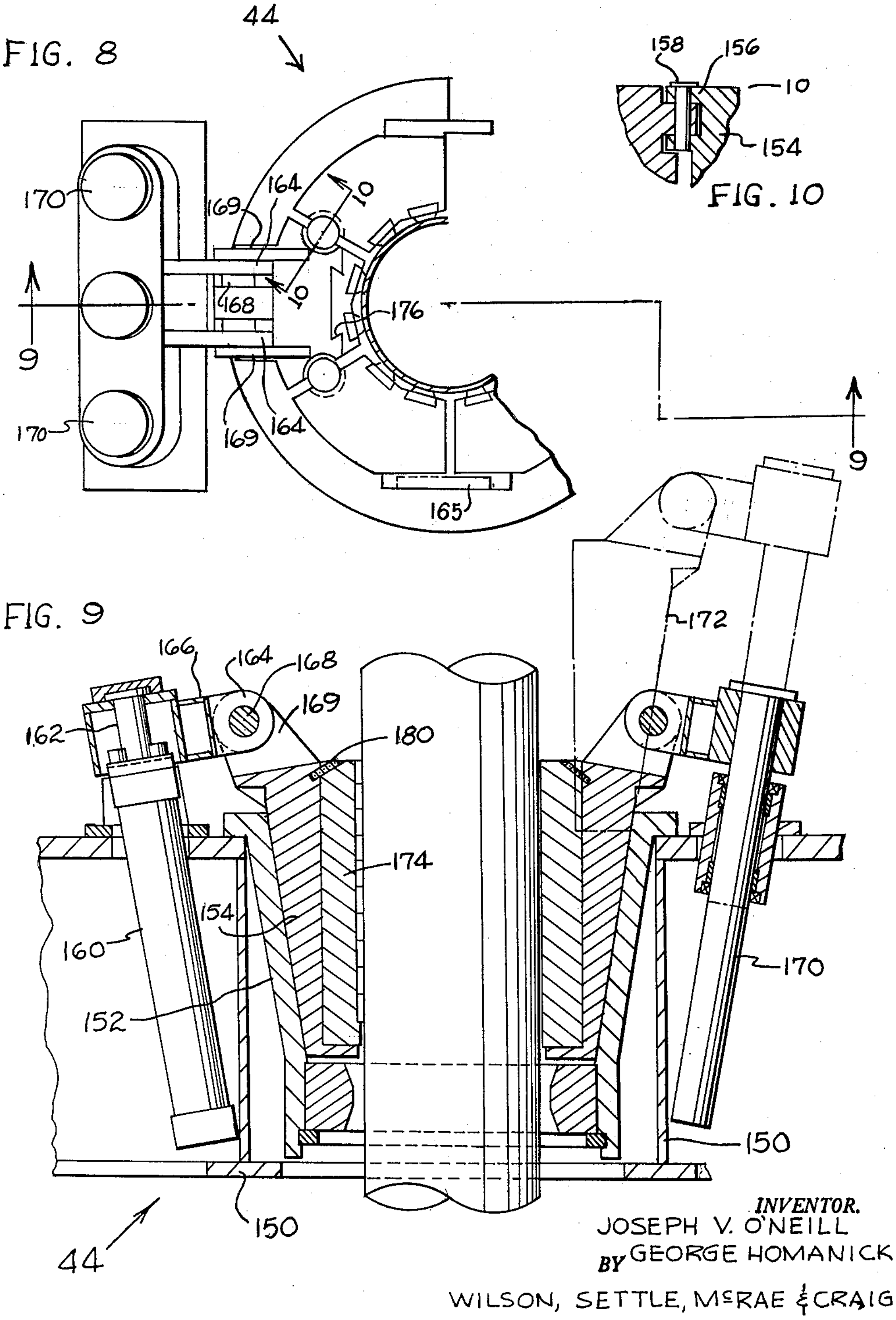
FIG. 8 is an enlarged top plan view of a portion of a temporary string-supporting mechanism employed in the FIG. 1 embodiment.
FIG. 9 is a sectional view taken substantially on line 9—9 in FIG. 8.
FIG. 10 is a fragmentary sectional view taken on line 10—10 in FIG. 8.
Figure 12:
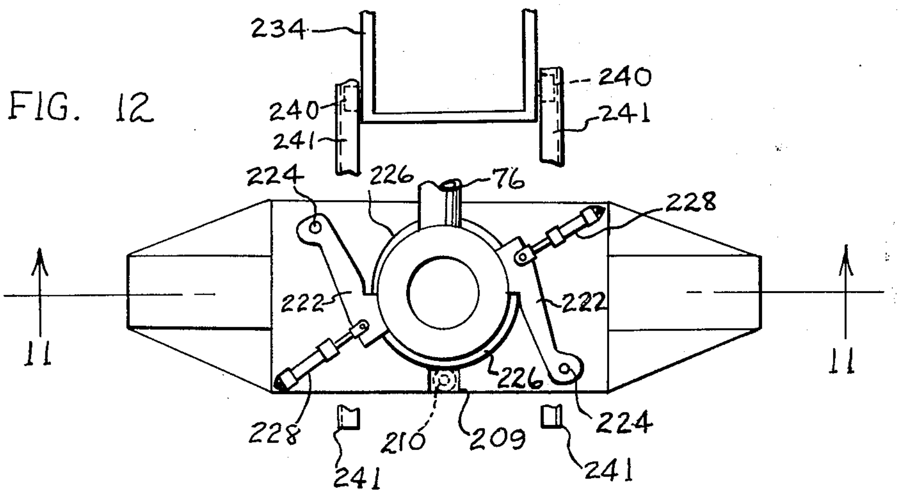
FIG. 12 is a top plan view of the structure shown in FIG. 11.

The temporary suspension means includes a fixed supporting structure 150 which comprises a frusto-conical shell structure 152. The arcuate internal surfaces of the shell structure serve to slidably support a plurality of interlocked sections 154. As shown in fragmentary FIG. 10 the various sections 154 are provided with ears, as at 156, and pins 158 are trained through the ears to permit the sections to pivot relative to one another as they are slid up and down on the shell 152. The overlapping ears serve to transmit motion from one section 154 to the adjacent section 154 so that the sections move in unison under the power input of fluid cylinders 160. Also, as shown in FIGURE 8, alignment fingers 165 are provided between the two halves of the unit, each half comprising three pivotally interlocked sections 154, to assure synchronized movement of all of the elements making up the unit. As shown in FIG. 9, each fluid cylinder is provided with a piston rod 162 which carries the crosshead 166. The crosshead mounts the spaced ears 164 which lie alongside ears 169 extending from one of the sections 154. The ears are pivotally connected together by a pin 168. Suitable guide rods are provided at 170 to prevent jamming of the mechanisms during movement of the components between their dotted line positions 172 (FIG. 9) and their full line positions.

The pipe gripping elements per se are formed as inserts 174. As shown in FIG. 8 the inserts are provided with dovetail surfaces 176 which permit the inserts to be removably mounted within the sections 154. As better shown in FIG. 9, a locking mechanism such as a screw 180 may be provided to lock the inserts within sections 154. The purpose in forming the pipe gripping elements separately from sections 154 is to enable the effective diameter of the jaw structure to be quickly changed in accordance with the size of pipe being handled at a particular moment. Thus, there are employed a plurality of different sized inserts, and as it becomes necessary to handle pipe of different diameter the inserts are removed from the sections 154 and replaced with inserts of different radial dimension. In this manner the effective diameter of the pipe jaws can be changed in a short period of time.

It will be understood that when the pipe is to be gripped pressure fluid may be pumped into the upper ends of cylinders 160 so as to move the parts from dotted line position 172 to the full line position. The downwardly converging direction of movement taken by the section 154 is such that the weight of the pipe string cooperates with the fluid pressures in the upper end of cylinders 160 to cause the elements 174 to tighten their grip on the pipe. With a suitable pipe string weight, little or no fluid pressure need be developed in cylinders 160. Thus, the illustrated construction is self-tightening on the pipe; i.e., the greater the weight of the string the greater the grip of the jaws thereon.

*Blow-Out Preventers 62 (FIGS. 11 Through 17)*

Figure 17:
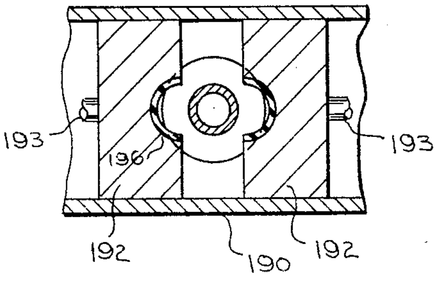
FIG. 17 is a fragmentary sectional view on line 17—17 in FIG. 11.
Figure 21:
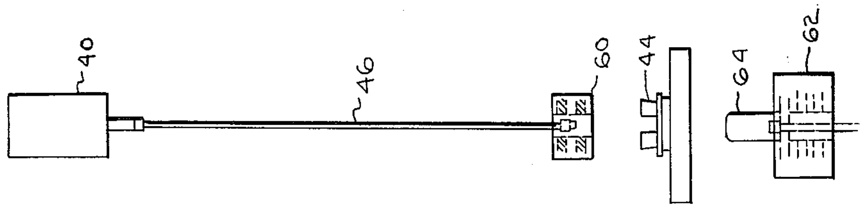
FIGS. 18 through 25 are schematic illustrations showing a sequence of movements which may be employed during operation of the FIG. 1 embodiment.

The illustrated blow-out preventers 62 comprises a housing structure 190 suitably partitioned to provide guideways for the slidable plates 192. Each plate is carried on the piston rod 193 of a fluid cylinder 195. The facing surfaces of the plates are concave as shown in FIG. 17, and a suitable rubber facing 196 is provided on the concave surfaces so as to seal against the pipe string surfaces after inward powering of cylinders 195 (as during the development of excessively high pressures within the well hole). The cylinders may be powered automatically by pressure-responsive switch-and-valve arrangements, or the cylinders may be powered in a semi-automatic manner under human control.

Figure 16:
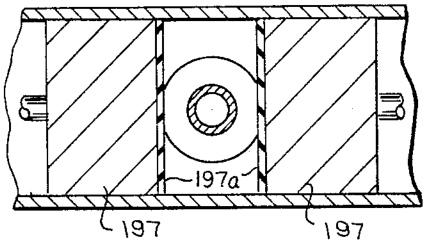
FIG. 16 is a fragmentary sectional view on line 16—16 in FIG. 11.

The plates 192 are operative to prevent blow-out only when string 42 is within the well hole. In order to prevent blow-outs when the string is disassembled (i.e. out of the hole) there is provided a second blow-out preventer defined by plates 197. These plates may be powered by fluid cylinders 198, and as shown in FIG. 16 the facing surfaces of the plates carry seal elements 197*a* that mate with one another so as to enable the plates to seal the well hole when the string is disassembled.

Figure 15:
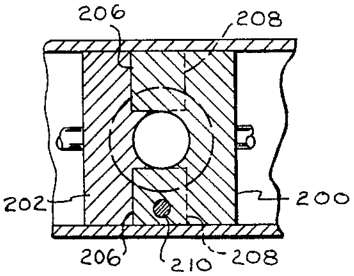
FIG. 15 is a fragmentary sectional view on line 15—15 in FIG. 11.

The arrangement of parts employed in the FIG. 1 apparatus is such that at certain times an auxiliary means must be utilized to support the string at a point below the seal 64 (to be described later). For this purpose there are provided the jaws 200 and 202 (FIGS. 11 and 15), each suitably connected with the piston rod of a fluid cylinder 204. Lateral edge areas 206 and 208 of the respective jaws are of reduced vertical thickness so as to overlap one another (FIG. 15). Additionally the housing structure 190 mounts a small vertical fluid cylinder 209 (FIG. 12) which is provided with a piston rod 210 (FIGS. 12 and 15) configured as a shot pin. By this arrangement the shot pin may be driven through aligned openings in the overlapping portions 206 and 208 so as to prevent separation of the jaws 200 and 202. In this connection it will be understood that the fluid pressures in cylinders 204 need not be maintained at an extremely high value in order to maintain the jaws 200 and 202 in operative supporting engagement with the drill string 42 since the locking pin 210 acts as a positive abutment element to prevent separation of these jaws. By the illustrated arrangement the extensive weight of the string may be supported by the jaws.

*Seal 64 (FIGS. 11 Through 14)*

Figure 11:
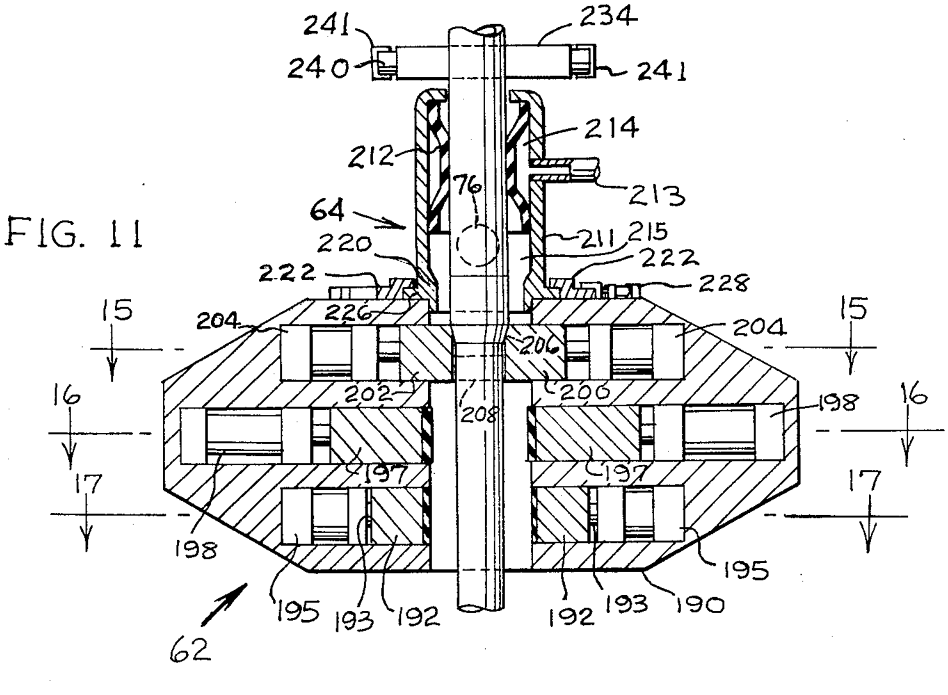
FIG. 11 is a sectional view on line 11—11 in FIG. 12 and illustrating the details of a sealing and blow-out preventing mechanism employed in the FIG. 1 embodiment.

As shown in FIG. 11, the seal comprises an upright casing 211 removably carried atop the housing 190 and mounting a deflectable annular sealing sleeve 212. The upper and lower ends of the sleeve are suitably sealed to casing 211, and a pressure line 213 is connected to casing 211 so as to develop a suitable pressure in the peripheral space 214. By this arrangement the deformable sleeve 212 is caused to have a satisfactory sealing contact with the surface of the rotating drill string during earth boring operations. The purpose of the seal is to direct the upwardly travelling cuttings from the space 215 outwardly through the discharge conduit 76. As previously noted in connection with the description of FIG. 1, the cuttings may be carried off with air or mud.

The drill bit is of course larger in diameter than the drill string, and accordingly the seal 64 must be removed from atop housing 190 when it is desired to remove the bit from the hole. A suitable apparatus for this purpose is shown in FIGS. 11 through 14.

As shown in FIG. 11 the seal casing 211 is provided with a pilot-forming extension 220 which guides it into position on housing 190 during installation. Removable locking of the seal casing is provided with the latch arms 222 which are pivoted at 224 (FIG. 12) so as to be movable into positions overlying flange 226 on casing 211. Powering of the latch arms to and from their latching positions may be accomplished with the two small fluid cylinders 228.

Figures 13, 14:
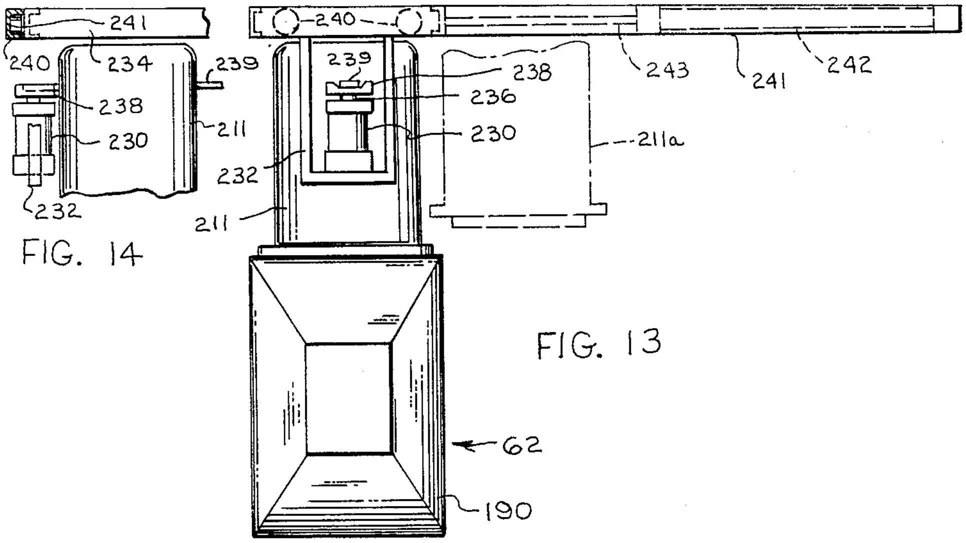
FIG. 13 is a right end elevational view of the FIG. 11 mechanism.
FIG. 14 is a fragmentary view taken at right angles to FIG. 13.

When the latch arms are in their unlatched positions the seal casing 211 may be moved upwardly off housing 190 by introduction of pressure fluid into cylinders 230 (FIGS. 13 and 14). Each of these cylinders is carried on a bracket 232 which depends from a horizontally movable trolley 234. The piston rod 236 for each cylinder carries a cradle 238 which serves as a seat for a lug 239 projecting from casing 211. For purposes of illustrating other components, the lugs, cradles and cylinders have been omitted from FIGS. 11 and 12. These elements are shown in FIGS. 13 and 14.

Trolley 234 may be formed as a rectangular frame and may be equipped with rollers 240 for its horizontal movement along the fixed rails 241 shown in FIGURES 1 and 2. Rails 241 are connected at their rear ends to the back of trailer 34, and at their front ends are carried by yokes 241*a*, connected to the base 14. A fluid cylinder 242 and piston rod 243 may be provided for trolley powering purposes.

The general sequence of motions during seal removal involves energization of cylinders 230 to lift the seal casing 211 off housing 190, followed by energization of cylinder 242 to move the casing to dotted line position 211*a*. Repositionment of the seal onto housing 190 involves the sequential energization of cylinders 242, 230 and 228.

*Operation of the FIG. 1 Apparatus*

During the process of drilling a well hole the drill string must be progressively lengthened in order to enable the bit to advance through the earth formations. Periodically the string must be removed from the hole in order to replace a worn bit (as by disconnecting the pipe in the string). The process of removing a string from the well hole may best be visualized by referring to schematic FIGS. 18 through 25.

Figure 19:
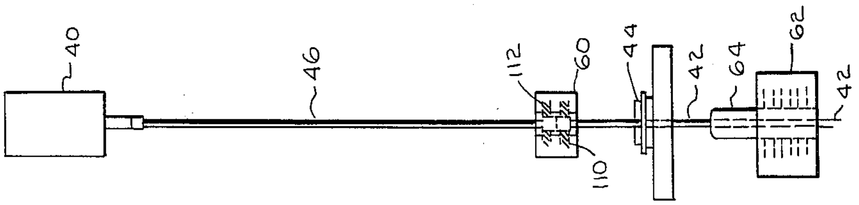
Figure 18:
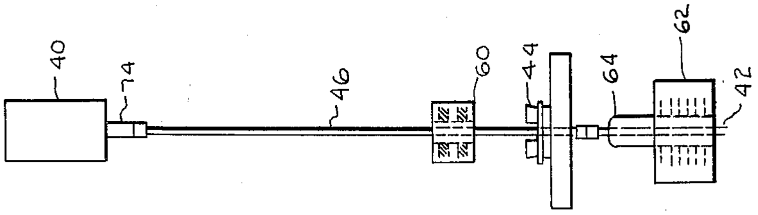

Initially the string is raised by powering the drill head 40 upwardly from its FIG. 18 position to its FIG. 19 position. At this time pipe 46 is part of the string 42. With the string in the FIG. 19 position the joint between pipe 46 and string 42 may be untorqued, as by suitable radial powering of the jaws 110 and 112, followed by rotation of the jaw 112 assembly. At this time the weight of the string is supported by the jaws of temporary suspension means 44. During each torquing or untorquing operation the head 40 will be shifted vertically slightly to accommodate the axial shifting of pipe 46 caused by the threading or unthreading action. The head movement is obtained with cylinders 41.

Figure 20:
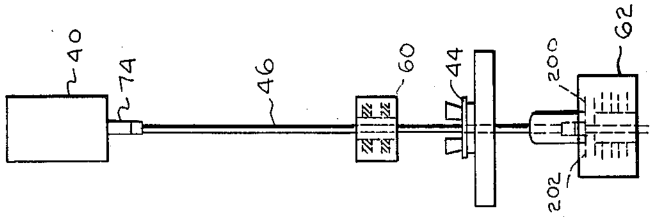

Referring to FIG. 19, after the joint between pipe 46 and string 42 has been untorqued the jaws 200 and 202 are closed and the jaws in suspension means 44 are opened slightly as shown in FIG. 20, and the drill head is lowered so as to position the pipe string in a supported location in jaws 200 and 202. The spindle 74 in head 40 is then powered rotatably to spin off the joint between pipe 46 and string 42, after which the head 40 may be powered upwardly to the FIG. 21 position.

Figure 23:
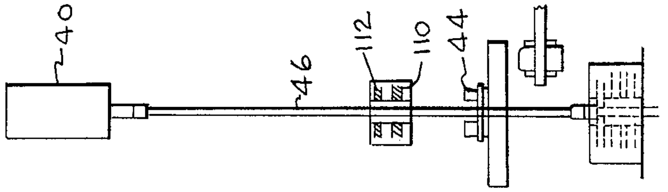
Figure 22:
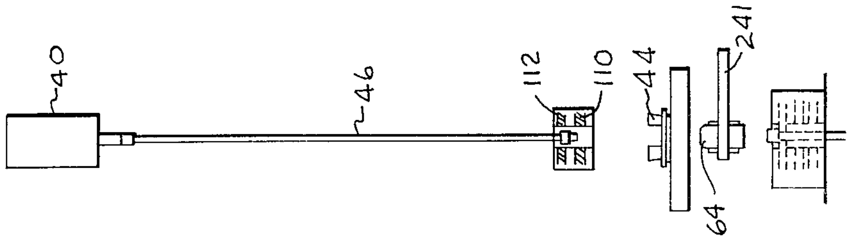

FIG. 22 illustrates the position of parts after the rotating seal 64 has been powered upwardly away from the blow-out preventers. FIG. 23 shows the rotating seal after it has been moved to the side by its fluid cylinder. FIG. 23 also illustrates the drill head as it is moved downwardly to enable pipe 46 to be reconnected with the upper pipe in string 42. In the illustrated embodiment it is necessary to reconnect pipe 46 with string 42 because the drill head cannot reach down below the suspension means 44 to grip the string. When the drill head has been lowered to its FIG. 23 position the fluid motors therein are energized to rotate the pipe 46, and spin on the joint between pipe 46 and string 42. Head 40 may then be powered upwardly to the FIG. 24 position after which suspension means 44 may be locked to the string and the joints spun apart by operation of the fluid motors within head 40. In the spinning-off operation the joint between pipe 46 may first be spun off with jaws 112 opened, and the joint between pipe 46 and spindle 74 may then be spun off with jaws 112 closed.

Figure 25:
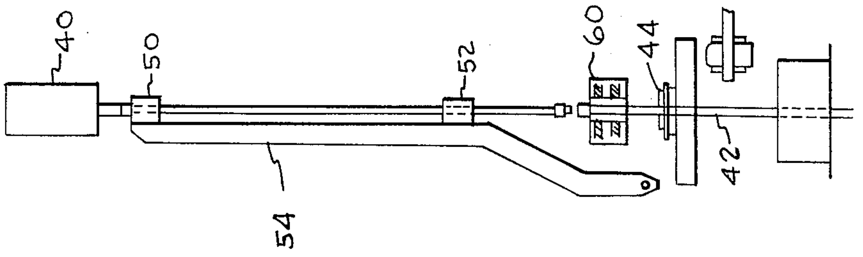

As shown in FIG. 25, mechanism 60 may be shifted downward slightly (by cylinders 106 in FIG. 5) to place the lower end of pipe 46 clear of the mechanism, after which the jaws 50 and 52 of arm 54 may be tightened on pipe 46. The transfer arm may then be rocked downwardly to completely remove pipe 46 from the string.

It will be understood that after the uppermost pipe in the string has been removed the succeeding pipe can be removed relatively quickly by repeating certain of the steps outlined above. In this regard it will be noted that removal of the first pipe is complicated by the necessity for removing the seal 64.

Figure 24:
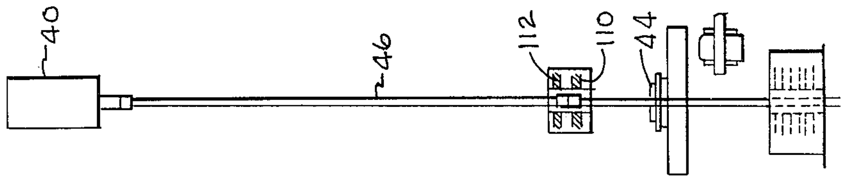

Removal of succeeding pipe may be accomplished by lowering head 40 to grasp the string, raising the head to the FIG. 24 position, sequentially untorquing the two joints, and transferring the untorqued pipe away through the use of transfer arm 54. The operation of assembling the drill string in the well hole and adding thereto can be accomplished in essentially a reverse series of movements from that described above.

Figure 26:
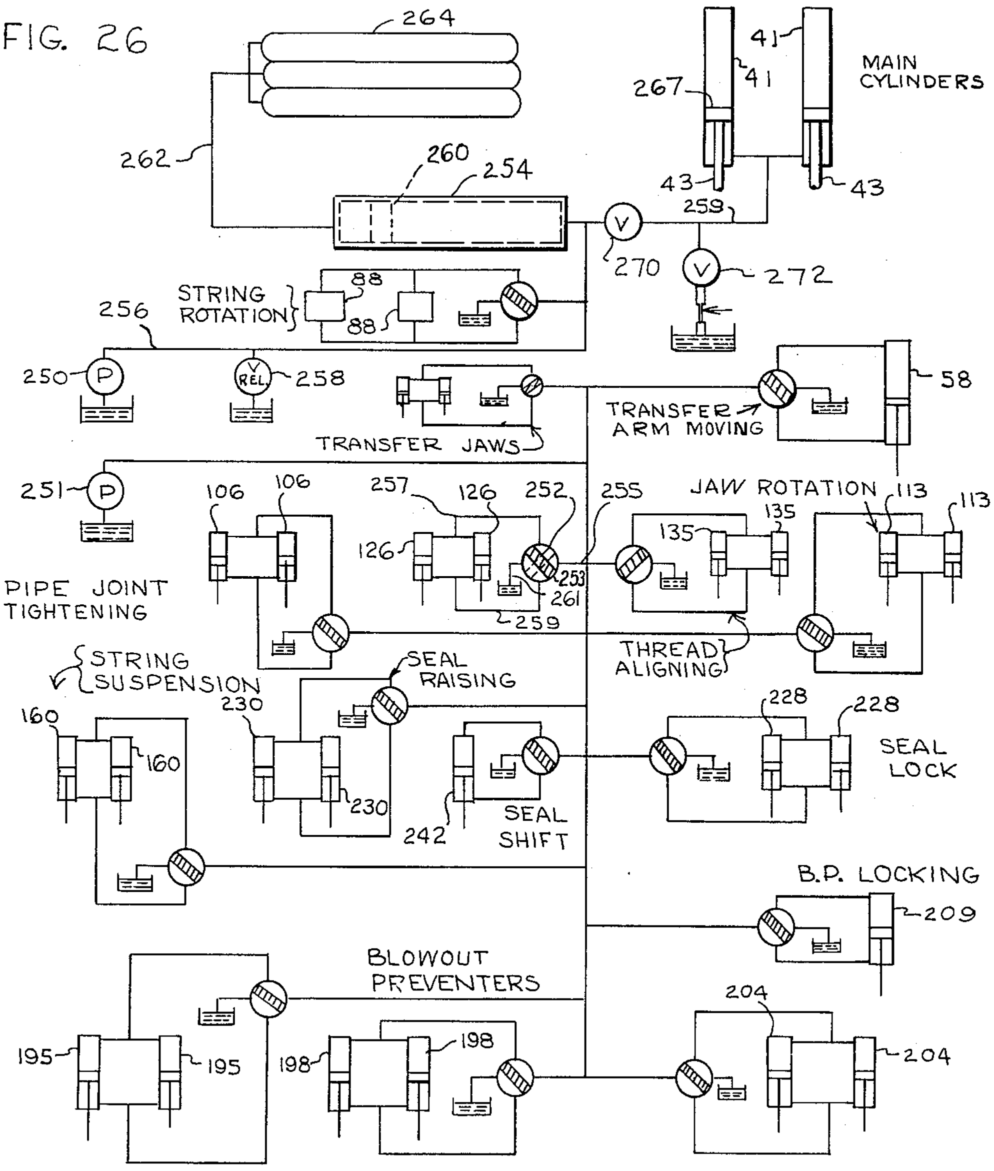
FIG. 26 is a schematic illustration of a fluid distribution system which may be employed in operating and controlling the FIG. 1 embodiment.

FIG. 26 illustrates schematically the general features of a fluid control system which can be employed to operate the illustrated apparatus. In the FIG. 26 arrangement the major fluid-operated cylinders are given numerals corresponding to those employed for the previously described components. Insofar as the pumping of fluid into the various cylinders is concerned, it will be seen that the operating fluid pressures are initially developed by pump means 250 and 251. Pump means 250 which preferably comprise a plurality of pumps feeding a common line supplies the main cylinders 41 and fluid motors 88, which are large energy consumers in the system. It is for this reason among others that pump means 250 is preferably isolated from pump means 251 which feeds the other energy consuming devices in the system. It will be understood that certain of the individual pumps collectively indicated by numeral 251 may be isolated from one another as might best suit operating pressure conditions in particular size rigs. For purpose of detecting localized failure in the electrical or hydraulic components it would be preferable to supply each component from a separate fluid pressure source. However other considerations would rule out such an arrangement in most cases.

In the illustrated arrangement the supply of fluid pressure from pump means 251 to each of the various components may be controlled by a series of individual valve devices, each similar in general character to the other in construction and operational positionment. A description of one valve device will therefore suffice for a description of all.

Referring to an illustrative valve 252 for the pipe tightening jaw cylinders 126, it will be seen that the valve is a four way valve having a movable flow-directing element 253 positionable in either the full line position or dotted line position as shown. One port of the valve communicates with a fluid supply line 255, a second port communicates with a line 257 leading to the upper ends of cylinders 126, a third port communicates with a line 259 leading to the lower ends of cylinders 126, and the fourth port communicates with a line 261 discharging back to the sump for pump means 251. The arrangement is such that when the flow-directing element is in the full line position pressure fluid is admitted to the upper ends of cylinders 126, and when the flow-directing element is in the dotted line position pressure fluid is admitted to the lower ends of cylinders 126. Conventional electrically-energized push buttons (not shown) may be utilized to operate the flow-directing element between the two positions. It will be understood that in practice various pressure regulating devices (not shown) may be used in the various supply lines to control the pressures and flow rates at desired values.

As previously indicated, each of the control valves in the FIG. 26 arrangement may be of similar construction and operation, and each may be controlled electrically under limit switch control. The drilling of oil wells is not capable of performance in a completely automatic manner from start to finish since some interrupting events (such as the breaking of a drill bit) occur which alter the orderly sequence. Therefore the automatic operational controls are utilized in conjunction with push button controls, as by placing each of the electrical switches in parallel with a manually operated switch. By such an arrangement control of the rig operation can be effected in an automatic or semi-automatic manner as occasion may require.

Returning to FIG. 26, one feature of interest is the employment of an accumulator cylinder 254 in conjunction with pump means 250 so that the pump means may be operated continuously and the accumulator discharged intermittently to develop a satisfactorily quick stroke of piston rods 43 without overload on the pump means. Line 256 for the motive fluid is provided with a relief valve 258, the arrangement being such that excessive pressure can be exhausted back to the liquid reservoir. At pressure values below the crack-open pressure of relief valve 258 the pressure fluid is directed from line 256 to an accumulator cylinder 254 and to a line 259 which is provided with a shut-off valve 270. During the lowering movement of pistons 43 valve 270 is closed so that the line 259 pressure can be controllably exhausted to the liquid reservoir via a throttling valve 272. During this period the fluid in line 256 (from pump means 250) is directed exclusively into accumulator cylinder 254 when the pressures are below the crack-open pressure of valve 258; when pressures rise above a predetermined value the pumped fluid is exhausted back to the sump via valve 258. Preferably pumps 250 are variable delivery devices.

As will be apparent from FIG. 26 the fluid introduced into cylinder 254 drives the movable piston 260 to the left. The space to the left of piston 260 is occupied by a pressurized compressible gas such as compressed air supplied from the storage vessels 264. Therefore leftward movement of piston 260 causes a high reaction pressure to be developed on the left face of the piston. By this arrangement the pump means 250 is enabled to charge cylinder 254 with a large quantity of high pressure fluid.

At times in the operating cycle when it is necessary that pistons 267 be moved upwardly in the main cylinders 41 the electrically-operated control valve 270 is opened (with valve 272 closed) so that the pressure reserve stored up in cylinder 254 is applied in the space below pistons 267. By this action the pistons 267 may be powered up quickly, after which the accumulator volume may be again increased by continued operation of pump means 250. The cycle is preferably one wherein the pumps 250 work continuously with a relatively low horsepower input. The low horsepower input can be utilized because of the action of the accumulator which in effect serves as a power reservoir to store up power for application to the pistons 267 when needed. The space below pistons 267 may be exhausted when desired by use of the metering escape valve means 272. This valve means may consist of one or more conventional metering devices openable partially or fully in accordance with the desired rate of movement. Generally during stabbing and torquing of the pipe joints and earth drilling periods the metering valve means will be opened partially so as to give a slow controlled descent of the piston rods 43 and the drill head carried thereby. To effect a fast downward movement of the drill head the metering valve means will be opened fully. It will be understood that control valve 270 and escape valve 272 are opened at different periods according as it becomes desirable to build up or exhaust pressure in the space below pistons 267.

Many features shown in the drawings are illustrative of the constructions which may be employed, and it will be understood that various modifications may be resorted to without departing from the spirit of the invention as set forth in the accompanying claims.

We claim:

1. In earth boring apparatus,
a derrick carrying a cross head in spaced relationship above the surface of the earth,
fluid cylinder means including a piston and rod carried by said cross head,
drill string suspension means connected to said fluid cylinder means for vertical movement on said derrick,
said drill string suspension means including a rotatable spindle to connect to the upper end of a pipe section,
a joint loosening-tightening mechanism carried by said derrick in spaced relationship beneath said drill string suspension means to make a connection between the lower end of said section and the top end of a drill string,
a temporary suspension means carried by said derrick beneath said joint loosening-tightening mechanism to temporarily support the drill string adjacent the upper end,
and an elongated pipe section transfer arm pivotally mounted at one end adjacent the base of the derrick and provided with means to move a section between horizontal storage position and working position in alignment between said drill string suspension means and said joint loosening-tightening mechanism by movement through a vertical plane,
whereby lowering of said drill string suspension means by said cylinder while said spindle is rotated is effective to make a connection between said drill string suspension means and the upper end of said temporarily supported section and thereafter on release of said section by said transfer arm, to rotate said section and make a connection between the bottom end of said section and the top end of said temporarily supported string, and said joint loosening-tightening mechanism being adapted to thereafter complete said string connection to desired torque.

2. In earth boring apparatus,
a derrick,
drill string suspension means carried by said derrick for vertical movement,
means for moving said drill string suspension means,
said drill string suspension means including a rotatable spindle to connect to one end of a pipe section,
a joint make-and-break mechanism carried by said derrick in spaced relationship beneath said drill string suspension means to make a joint between the lower end of said section and a drill string,
temporary suspension means carried by said derrick beneath said joint make-and-break mechanism to temporarily support the drill string adjacent the upper end,
and a pipe section transfer arm provided with means to temporarily support a section between said drill string suspension means and said joint make-and-break mechanism,
whereby lowering of said drill string suspension means while said spindle is rotated makes a joint between said drill string suspension means and the upper end of said section and thereafter on release of said section by said transfer arm, to rotate said section and make a joint between the bottom end of said section and the top end of said string, and said joint make-and-break mechanism being adapted to thereafter complete said string joint.

3. In a portable earth boring apparatus, a platform for overland transport and having a drilling derrick pivotally mounted thereon for movement a horizontal transport position and a vertical drilling position,
drill string suspension means carried by said derrick for movement along said derrick,
means for controllably moving said drill string suspension means,
said drill string suspension means including a rotatable spindle to connect to one end of a pipe section,
a temporary suspension means carried by said derrick in axially spaced relation to said drill string suspension means to support a drill string adjacent the upper end thereof,
a joint loosening-tightening mechanism carried by said derrick adjacent said temporary suspension means and between said temporary suspension means and said drill string suspension means to make and break a drill pipe joint,
and an elongated pipe section transfer arm pivotally mounted at one end adjacent the base of the derrick and provided with means to move a section between horizontal storage position and working position between said drill string suspension means and said joint loosening-tightening mechanism by movement through a vertical plane and temporarily support the section in said position.

4. In portable earth boring apparatus,
an elongated platform for overland transport,
a drilling derrick pivotally mounted at one end to one end of said platform for movement between a horizontal transport position and a vertical drilling position,
drill string suspension means carried by said derrick for movement therealong,
means for controllably moving said drill string suspension means,
said drill string suspension means including a rotatable spindle to connect to one end of a pipe section,
a temporary suspension means carried by said derrick in axially spaced relation to said drill string suspension means to support a drill string adjacent the upper end thereof within an earth bore with said derrick at drilling position,
joint loosening-tightening means carried by said derrick adjacent said temporary suspension means and between said temporary suspension means and said drill string suspension means,
and an elongated pipe section transfer arm pivoted at one end to said derrick adjacent said derrick platform pivot and provided with means to transfer a pipe section between a horizontal position on said platform and vertical drilling position by movement solely within a vertical plane.

References Cited in the file of this patent

UNITED STATES PATENTS

| | | |
|---|---|---|
| 900,636 | Woodard | Oct. 6, 1908 |
| 1,632,889 | Davis | June 21, 1927 |
| 1,836,130 | Reighner | Dec. 15, 1931 |
| 2,450,934 | Calhoun | Oct. 12, 1948 |
| 2,491,711 | Calhoun | Dec. 20, 1949 |
| 2,563,913 | Binney | Aug. 14, 1951 |
| 2,578,959 | Yarborough | Dec. 18, 1951 |
| 2,633,333 | Storm | Mar. 31, 1953 |
| 2,721,446 | Bumb | Oct. 25, 1955 |
| 2,849,212 | Robbins | Aug. 26, 1958 |
| 2,918,085 | Govan et al. | Dec. 22, 1959 |
| 2,956,782 | Mistrot | Oct. 18, 1960 |
| 2,972,388 | Thornburg | Feb. 21, 1961 |
| 3,002,560 | Paget | Oct. 3, 1961 |
| 3,025,918 | Leven | Mar. 20, 1962 |

FOREIGN PATENTS

| | | |
|---|---|---|
| 1,183,307 | France | July 6, 1959 |

UNITED STATES PATENT OFFICE
CERTIFICATE OF CORRECTION

Patent No. 3,158,213 November 24, 1964

Joseph V. O'Neill et al.

It is hereby certified that error appears in the above numbered patent requiring correction and that the said Letters Patent should read as corrected below.

Column 5, line 11, strike out "is", first occurrence; column 12, line 3, before "a", first occurrence, insert -- between --.

Signed and sealed this 27th day of April 1965.

(SEAL)
Attest:

ERNEST W. SWIDER
Attesting Officer

EDWARD J. BRENNER
Commissioner of Patents